Sept. 27, 1927. 1,643,610
F. ROSENZWEIG
PROCESS FOR RECOVERING METALS FROM SLAG
Filed Sept. 17, 1926
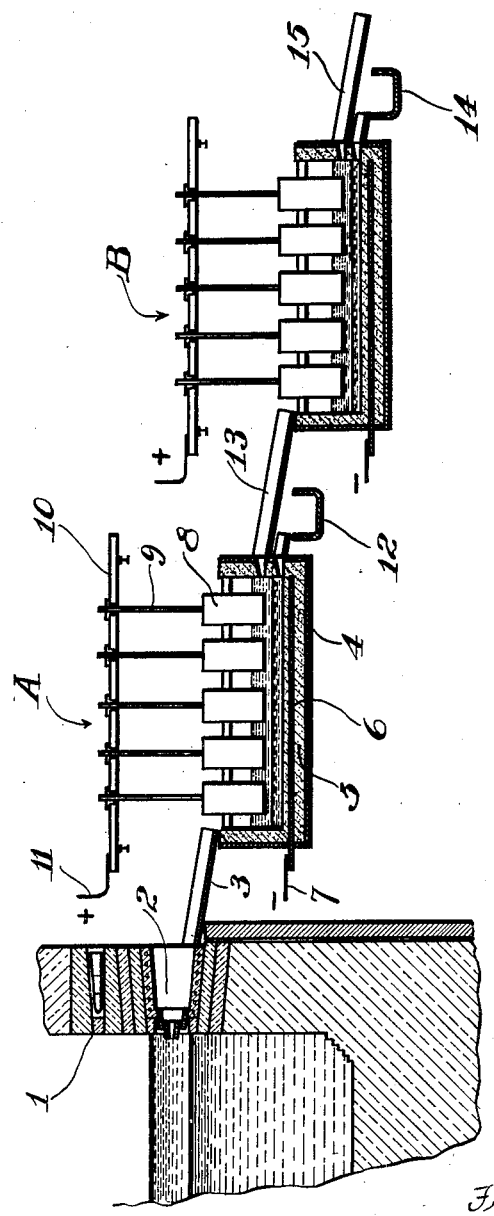
INVENTOR
Fred Rosenzweig
by
James E. Bradley
atty.

Patented Sept. 27, 1927.

1,643,610

UNITED STATES PATENT OFFICE.

FRED ROSENZWEIG, OF PITTSBURGH, PENNSYLVANIA.

PROCESS FOR RECOVERING METALS FROM SLAG.

Application filed September 17, 1926. Serial No. 136,060.

The invention relates to a process for recovering certain metal values from blast furnace slag, such as aluminum and magnesium. Slag varies widely in the proportion of its constituents, but in general, analysis shows a percentage of $Al_2O_3$ of from 12 to 18 and of MgO from 1 to 6, and I have found that these oxides may be readily reduced and the metals separated from the body of the slag by the method hereinafter set forth, the object of the invention being to recover the metals specified economically, with a minimum expenditure of electric current, and with a low labor cost. One of the factors contributing to these results is the step of flowing the slag in a molten state directly into the electrical reducing furnace, so that the labor of handling the slag is avoided, and its residual heat is utilized in connection with the reducing operation. Apparatus for carrying out the process is illustrated in the accompanying drawings, wherein:

The figure is a diagrammatic partial section through the apparatus.

Referring to the drawing, 1 is a part of the lower end of a blast furnace for reducing iron ore of the ordinary type having the usual slag outlet 2, which is opened from time to time (by breaking the solidified slag in the opening) and permitting the liquid slag to flow through the trough 3 to the electric furnace A.

The electric furnace may be of any approved type suitable for the purpose. The base 4 is provided with a carbon lining 5, in which is embedded the metal plate 6 which constitutes one electric terminal from the line 7. The anodes 8 are of carbon supported for vertical adjustment by means of the bars 9 carried by the frame 10. This frame may be removed bodily by an overhead crane when it becomes necessary to secure a clear space above the bath. The frame also constitutes the terminal of the line 11.

The anodes are partially immersed in the bath of slag, which is supplied from the furnace, and on the application of a suitable current, electrolysis occurs, including a reduction of the aluminum oxide in the molten slag, so that a deposit of metallic aluminum occurs. The current required varies with the size of the anodes, an anode having a cross section of 100 square inches requiring in the neighborhood of 2000 amperes (direct current) with a voltage of from 4 to 6. The metallic liquid aluminum, mixed with some silicon and other impurities, may be withdrawn into a crucible 12 at suitable intervals, and the bulk of the slag remaining is run through the trough 13 to a second electric furnace B, similar in all respects to the one just described. Here the slag is subject again to electrolytic action in order to reduce the magnesium oxide in the bath and so recover metallic magnesium. The amount of current and its voltage will depend on conditions, including the size of the anodes. The metallic magnesium is withdrawn from time to time into the ladle 14, and the bulk of the slag allowed to escape through the trough 15. The molten bath in this furnace, as well as that in the furnace A, is preferably covered with a layer of powdered coke, which conserves the heat in the both and protects the carbon anodes from being eaten away by atmospheric oxygen. If it happens that there are other metallic values in the slag to recover other than aluminum and magnesium, the process may be carried still further by the use of as many additional electric furnaces as may be required. The process has the advantage of utilizing a product which is otherwise practically valueless, and the reduction may be carried on at a relatively low cost because of the application of the electric current, while the slag still retains the relatively high temperature incident to its separation in the blast furnace. Other advantages will be readily apparent to those skilled in the art.

What I claim is:

1. A process of recovering metal from blast furnace slag which includes the metal in the form of an oxide, which consists in flowing such slag from the furnace, applying an electric current to such slag while it is still molten to effect a reduction of the metal from its oxide and collecting said metal.

2. A process of recovering a plurality of different metals from blast furnace slag which includes such metals in the form of oxides which consists in flowing the slag from the furnace, applying an electric current to such slag while it is still molten to effect the reduction of one of the metals in the slag from its oxide, collecting said metal conducting the remainder of the slag away, applying an electric current to such remainder while it is still molten to effect the reduction of one of the other metals in the slag from its oxide, and collecting such other metal.

3. A process of recovering metallic aluminum from blast furnace slag which includes the aluminum in the form of an oxide, which consists in flowing the slag from the furnace, applying electric current to such slag, while it is still in a molten condition to effect a reduction of the aluminum from its oxide, and collecting said metal.

4. A process of recovering metallic aluminum and metallic magnesium from blast furnace slag which includes such metals in the form of oxides, which consists in flowing the slag from the furnace, applying an electric current to such slag while it is still molten to effect the reduction of the aluminum from its oxide, collecting such aluminum, conducting the remainder of the slag away, applying an electric current to such remainder while it is still molten to effect the reduction of the magnesium from its oxide, and collecting such magnesium.

In testimony whereof, I have hereunto subscribed my name this 11, day of September, 1926.

FRED ROSENZWEIG.